United States Patent
Fujimori et al.

(10) Patent No.: US 8,230,114 B2
(45) Date of Patent: Jul. 24, 2012

(54) SYSTEM AND METHOD FOR IMPLEMENTING A SINGLE CHIP HAVING A MULTIPLE SUB-LAYER PHY

(75) Inventors: Ichiro Fujimori, Irvine, CA (US); Tuan Hoang, Westminster, CA (US); Ben Tan, Redondo Beach, CA (US); Lorenzo Longo, Laguna Beach, CA (US)

(73) Assignee: Broadcom Corporation, Irvine, CA (US)

( * ) Notice: Subject to any disclaimer, the term of this patent is extended or adjusted under 35 U.S.C. 154(b) by 2003 days.

(21) Appl. No.: 10/282,933

(22) Filed: Oct. 29, 2002

(65) Prior Publication Data

US 2004/0030805 A1  Feb. 12, 2004

Related U.S. Application Data (60) Provisional application No. 60/402,097, filed on Aug. 7, 2002.

(51) Int. Cl.
*G06F 15/16* (2006.01)
(52) U.S. Cl. .................................. 709/250; 709/200
(58) Field of Classification Search .................. 709/200, 709/250
See application file for complete search history.

(56) References Cited

U.S. PATENT DOCUMENTS

| | | | | |
|---|---|---|---|---|
| 4,858,232 A * | 8/1989 | Diaz et al. | | 370/465 |
| 5,721,935 A * | 2/1998 | DeSchepper et al. | | 713/323 |
| 6,031,786 A * | 2/2000 | Jang et al. | | 365/233 |
| 6,049,837 A | 4/2000 | Youngman | | |
| 6,157,232 A * | 12/2000 | Hossner et al. | | 327/159 |
| 6,185,247 B1 * | 2/2001 | Williams et al. | | 375/212 |
| 6,389,092 B1 | 5/2002 | Momtaz | | |
| 6,400,291 B1 * | 6/2002 | Sankey | | 341/100 |
| 6,665,367 B1 * | 12/2003 | Blair | | 377/20 |
| 6,809,606 B2 * | 10/2004 | Wong et al. | | 331/175 |
| 6,845,055 B1 * | 1/2005 | Koga et al. | | 365/229 |
| 6,859,825 B1 * | 2/2005 | Williams | | 709/220 |
| 6,871,301 B1 * | 3/2005 | Deng | | 714/700 |
| 6,975,675 B2 * | 12/2005 | Shi et al. | | 375/229 |
| 6,985,041 B2 * | 1/2006 | Wong et al. | | 331/46 |
| 7,010,621 B2 * | 3/2006 | Calkins et al. | | 709/250 |
| 7,020,729 B2 * | 3/2006 | Taborek et al. | | 710/305 |

(Continued)

FOREIGN PATENT DOCUMENTS

EP  0863640  9/1998

(Continued)

OTHER PUBLICATIONS

10 Gigabit Ethernet Alliance, 10 Gigabit Ethernet Technology Overview White Paper, May 2001.*

(Continued)

*Primary Examiner* — Joshua Joo
(74) *Attorney, Agent, or Firm* — Thomas, Kayden, Horstemeyer & Risley, LLP (57) ABSTRACT

A system and method are disclosed for supporting 10 Gigabit digital serial communications. Many of the functional components and sublayers of a 10 Gigabit digital serial communications transceiver module are integrated into a single IC chip using the same CMOS technology throughout the single chip. The single chip includes a PMD transmit/receive CMOS sublayer, a PMD PCS CMOS sublayer, a XGXS PCS CMOS sublayer, and a XAUI transmit/receive CMOS sublayer. The single chip supports both 10 Gigabit Ethernet operation and 10 Gigabit Fibre Channel operation. The single chip interfaces to a MAC, an optical PMD, and non-volatile memory.

16 Claims, 8 Drawing Sheets

U.S. PATENT DOCUMENTS

| | | | | |
|---|---|---|---|---|
| 7,305,014 B2* | 12/2007 | Kirk et al. | | 370/539 |
| 2003/0106038 A1* | 6/2003 | Rategh et al. | | 716/21 |
| 2003/0206067 A1* | 11/2003 | Wong et al. | | 331/46 |
| 2003/0215243 A1* | 11/2003 | Booth | | 398/135 |
| 2003/0225955 A1* | 12/2003 | Feldstein et al. | | 710/306 |
| 2004/0240485 A1* | 12/2004 | Lipski et al. | | 370/537 |
| 2005/0186933 A1* | 8/2005 | Trans | | 455/296 |

FOREIGN PATENT DOCUMENTS

| | | |
|---|---|---|
| WO | WO 01/47159 | 6/2001 |

OTHER PUBLICATIONS

Work-Group Computing Report, Broadcom Enters Optical Networking Market with World's First 10 Gigabit 4-Channel CMOS Transceiver; Transceiver Extends Ethernet Networking into the WAN, May 8, 2000.*

GRID today, BitBlitz Annouces Multi-Protocol 10 Gb Serial Transceiver, Sep. 9, 2002.*

Application Brief, Tyco Electronics XAUI HM-Zd Interoperability Platform and Mindspeed Technologies, 2001, pp. 1-6.*

Lucent Technologies introduces hybrid systems-on-a-chip for 10 Gigabit Ethernet over optical networks, Nov. 20, 2000.*

Physical Layer Proposal for BWA, Wayne Hunter/Leland Langston, Oct. 29, 1999.*

10 GEA, 10 Gigabit Ethernet Technology Overview White Paper, May 2001.*

* cited by examiner

SYSTEM AND METHOD FOR IMPLEMENTING A SINGLE CHIP HAVING A MULTIPLE SUB-LAYER PHY

CROSS-REFERENCE TO RELATED APPLICATIONS/INCORPORATION BY REFERENCE

This application also makes reference to, claims priority to and claims the benefit of U.S. Provisional Patent Application Ser. No. 60/402,097 filed on Aug. 7, 2002 and entitled "System and Method for Implementing a Single Chip having a Miltiple Sub-Layer PHY."

"U.S. Pat. No. 6,424,194, U.S. application Ser. No. 09/540,243 filed on Mar. 31, 2000, U.S. Pat. Nos. 6,389,092, 6,340,899, U.S. application Ser. No. 09/919,636 filed on Jul. 31, 2001, U.S. application Ser. No. 09/860,284 filed on May 18, 2001, U.S. application Ser. No. 10/028,806 filed on Oct. 25, 2001, U.S. application Ser. No. 09/969,837 filed on Oct. 1, 2001, U.S. application Ser. No. 10/159,788 entitled "Phase Adjustment in High Speed CDR Using Current DAC" filed on May 30, 2002, and U.S. application Ser. No. 10/179,735 entitled "Universal Single-Ended Parallel Bus; fka, Using 1.8V Power Supply in .13 MM CMOS" filed on Jun. 21, 2002, are each incorporated herein by reference in their entirety.

FEDERALLY SPONSORED RESEARCH OR DEVELOPMENT

[Not Applicable]

[SEQUENCE LISTING]

[Not Applicable]

[MICROFICHE/COPYRIGHT REFERENCE]

[Not Applicable]

BACKGROUND OF THE INVENTION

Embodiments of the present invention relate generally to a system and method corresponding to part of a physical layer (PHY) in a high-speed digital communications system, and more particularly to integrating many of the physical layer functions in a high-speed digital transceiver module.

High-speed digital communication networks over copper and optical fiber are used in many network communication and digital storage applications. Ethernet and Fibre Channel are two widely used communication protocols used today and continue to evolve to respond to the increasing need for higher bandwidth in digital communication systems.

The Open Systems Interconnection (OSI) model (ISO standard) was developed to establish standardization for linking heterogeneous computer and communication systems. The OSI model includes seven distinct functional layers including Layer 7: an application layer; Layer 6: a presentation layer; Layer 5: a session layer; Layer 4: a transport layer; Layer 3: a network layer; Layer 2: a data link layer; and Layer 1: a physical layer. Each OSI layer is responsible for establishing what is to be done at that layer of the network but not how to implement it.

Layers 1 to 4 handle network control and data transmission and reception. Layers 5 to 7 handle application issues. Specific functions of each layer may vary to a certain extent, depending on the exact requirements of a given protocol to be implemented for the layer. For example, the Ethernet protocol provides collision detection and carrier sensing in the data link layer.

The physical layer, Layer 1, is responsible for handling all electrical, optical, and mechanical requirements for interfacing to the communication media. The physical layer provides encoding and decoding, synchronization, clock data recovery, and transmission and reception of bit streams. Typically, high-speed electrical or optical transceivers are the hardware elements used to implement this layer.

As data rate and bandwidth requirements increase, 10 Gigabit data transmission rates are being developed and implemented in high-speed networks. There is much pressure to develop a 10 Gigabit physical layer for high-speed serial data applications. XENPAK (XAUI module specification) compatible transceivers for 10 G applications may be used for the 10 G physical layer. XPAK (second generation to XENPAK specification) compatible transceivers for 10 G applications may also be used for the 10 G physical layer. The specification IEEE P802.3ae draft 5 describes the physical layer requirements for 10 Gigabit Ethernet applications and is incorporated herein by reference in its entirety. The 10 Gigabit Fibre Channel standard draft describes the physical layer requirements for 10 Gigabit Fibre Channel applications.

An optical-based transceiver, for example, includes various functional components such as clock data recovery, clock multiplication, serialization/de-serialization, encoding/decoding, electrical/optical conversion, descrambling, media access control, controlling, and data storage. Many of the functional components are often implemented in separate IC chips.

In the physical layer, several sublayers are supported. As an example, for 10 Gigabit serial operation, some of the key sublayers include a PMD TX/RX (physical media dependent transmit and receive) sublayer, a PMD PCS (physical media dependent physical encoding) sublayer, a XGXS PCS (10 Gigabit media independent interface extender physical encoding) sublayer, and a XAUI TX/RX (10 Gigabit attachment unit interface transmit and receive) sublayer.

Figure 1:
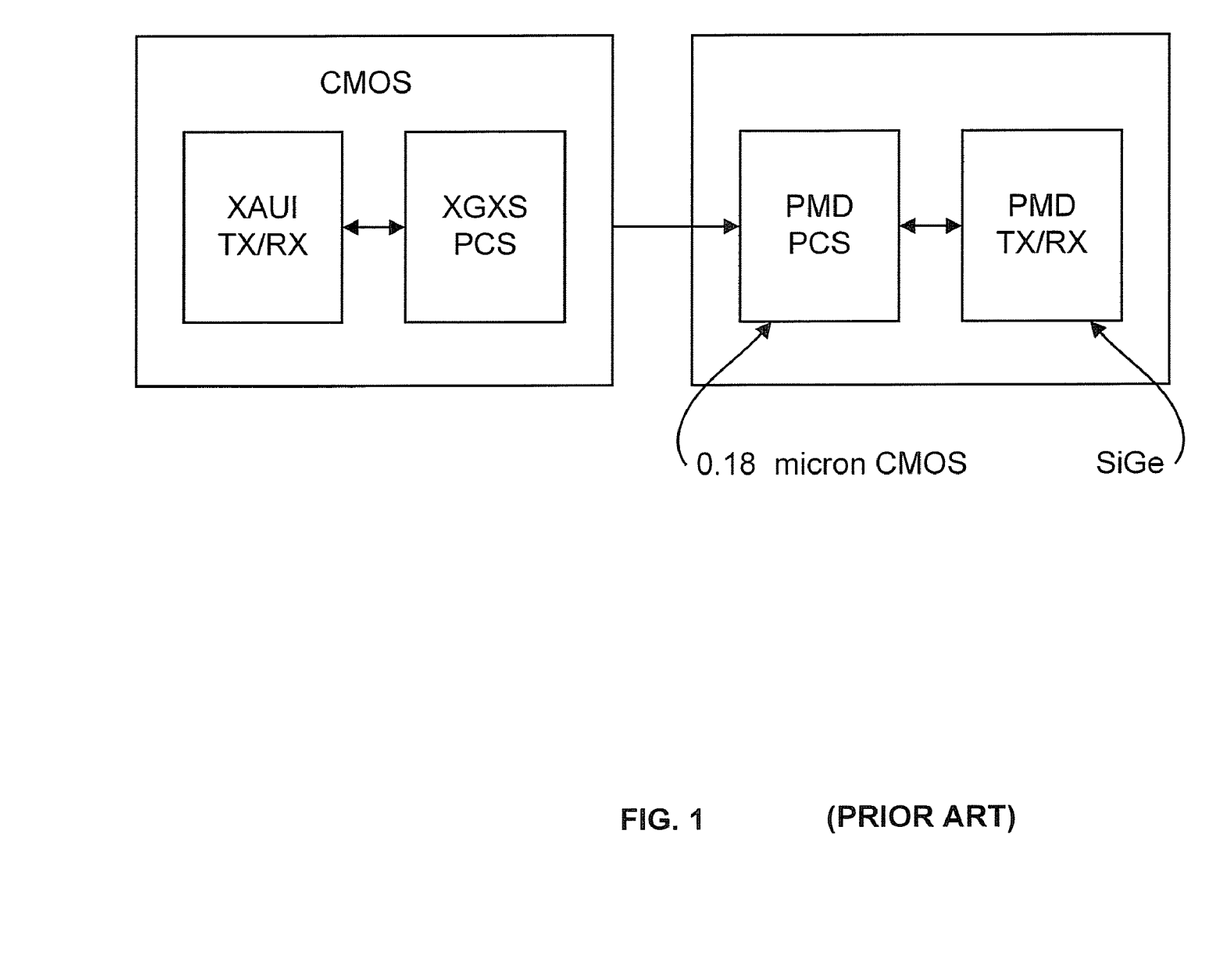
FIG. 1 is a schematic block diagram of a first typical implementation of several physical layer sublayers in a transceiver module.
Figure 2:
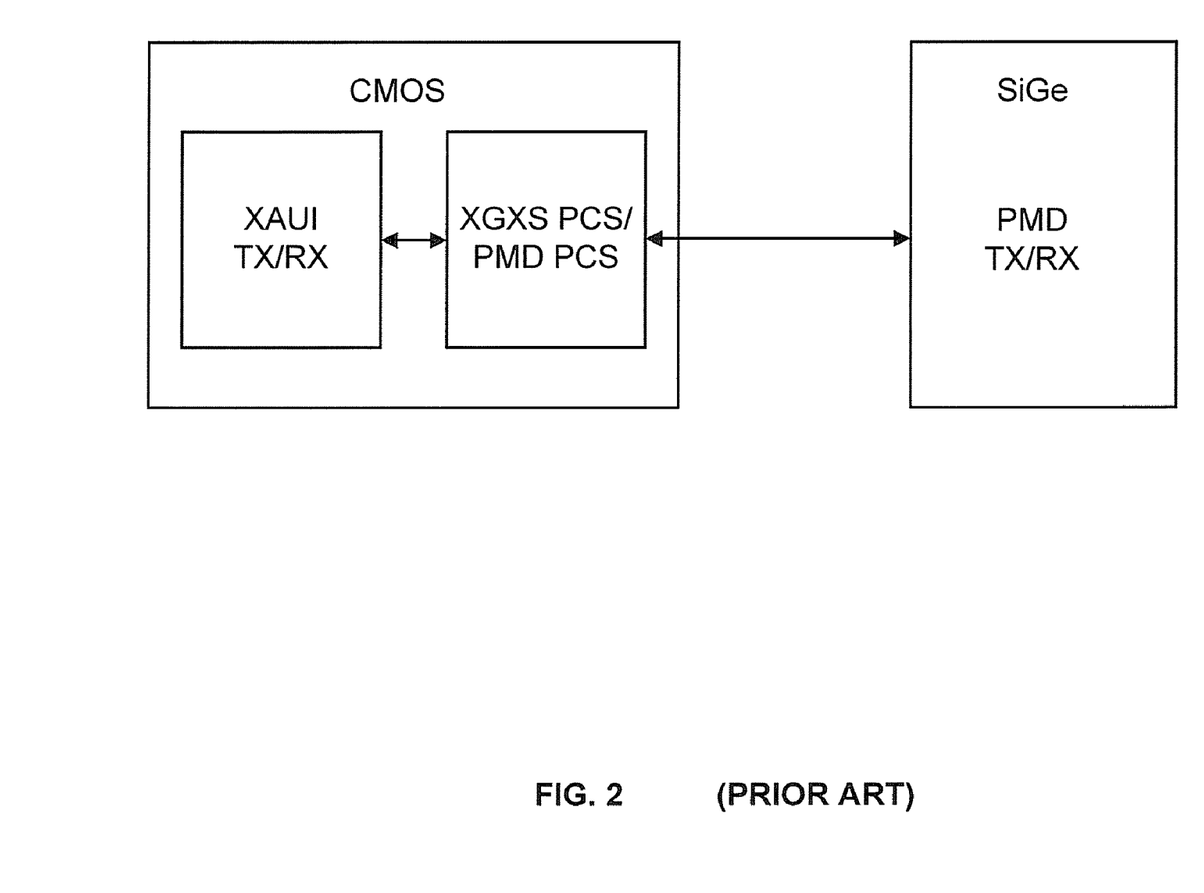
FIG. 2 is a schematic block diagram of a second typical implementation of several physical layer sublayers in a transceiver module.
Figure 3:
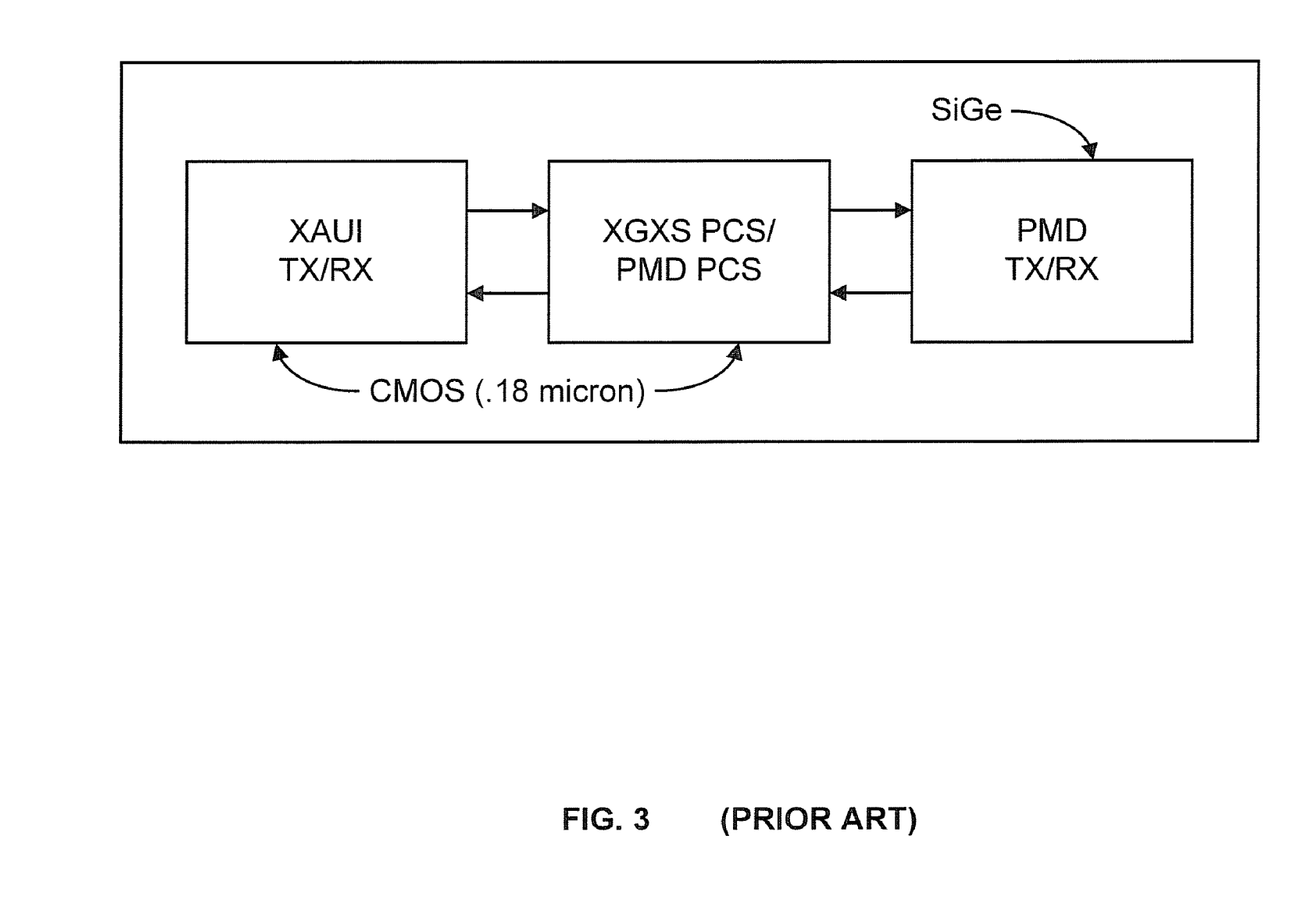
FIG. 3 is a schematic block diagram of a third typical implementation of several physical layer sublayers in a transceiver module.

FIGS. 1-3 show typical implementations of the various sublayers. In FIG. 1, the XAUI TX/RX sublayer and the XGXS PCS sublayer are implemented in CMOS on a single chip. The PMD PCS sublayer and PMD TX/RX sublayer are implemented on a second chip where the PMD PCS sublayer is implemented in 0.18 micron CMOS technology and the PMD TX/RX sublayer is implemented in SiGe technology. An interface between the two chips is required such as a XGMII (10 Gb media independent interface). The different technologies of the different chips and within the second chip require different voltage levels and, therefore, additional level translation circuitry within the transceiver module and/or within the second chip. Also, the interface between the two chips adds additional complexity and extra power dissipation to the transceiver module.

In FIG. 2, the XAUI TX/RX sublayer and the XGXS PCS and PMD PCS sublayers are implemented on a single chip in CMOS technology. The PMD TX/RX sublayer is implemented on a second chip in SiGe technology. An interface between the two chips is required. The different technologies of the different chips require different voltage levels and, therefore, additional level translation circuitry within the transceiver module. Also, the interface between the two chips adds additional complexity and extra power dissipation to the transceiver module.

In FIG. 3, the XAUI TX/RX sublayer, and the XGXS PCS and PMD PCS sublayers are implemented on a single chip in 0.18 micron CMOS technology. Also, the PMD TX/RX sublayer is implemented on the same chip with SiGe technology. All four sublayers are implemented on a single chip but using a combination of different technologies. The different technologies require different voltage levels and, therefore, additional circuitry to perform level translation of voltages within the chip. Also, the mixture of different process technologies will add extra steps to the fabrication process which will increase cost.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Certain embodiments of the present invention provide a method and system for supporting 10 Gigabit digital serial communications. Aspects of the present invention address one or more of the problems outlined above. It is desirable to combine many of the functional components and sublayers of a 10 Gigabit transceiver module into a single IC chip using the same technology throughout to reduce cost, power consumption, complexity, and noise and to enhance overall transceiver performance.

A system of the present invention includes a single-chip multi-sublayer PHY comprising a PMD transmit/receive CMOS sublayer, a PMD PCS CMOS sublayer, a XGXS PCS CMOS sublayer, and a XAUI transmit/receive CMOS sublayer using a single CMOS technology. The single-chip multi-sublayer PHY supports both 10 Gigabit Ethernet operation and 10 Gigabit Fibre Channel operation.

A method of the present invention provides for integrating a PMD transmit/receive CMOS sublayer, a PMD PCS CMOS sublayer, a XGXS PCS CMOS sublayer, and a XAUI transmit/receive CMOS sublayer into a single-chip multi-sublayer PHY using a single CMOS technology. Both 10 Gigabit Ethernet operation and 10 Gigabit Fibre Channel operation are supported by said integrating.

These and other advantages, aspects and novel features of the present invention, as well as details of an illustrated embodiment thereof, will be more fully understood from the following description and drawings.

DETAILED DESCRIPTION OF THE INVENTION

The PMD TX/RX sublayer (physical media dependent transmit and receive sublayer) provides the electrical functionality for transmission and reception of 10 Gigabit serial data. The functionality includes clock multiplication and data serialization, clock data recovery and data de-serialization, signal amplification and equalization, and differential signal driving.

The PMD PCS sublayer (physical media dependent physical encoding sublayer) is responsible for coding data to be transmitted and decoding data to be received on the PMD side of the transceiver. The functionality includes 64B/66B synchronization, descrambling, and decoding, 64B/66B encoding and scrambling, data transitioning, multiplexing, and phase detecting.

The XGXS PCS sublayer (10 Gigabit media independent interface extender physical encoding sublayer) is responsible for coding data to be transmitted and decoding data to be received on the XAUI side of the transceiver. The functionality includes 8B/10B encoding, 8B/10B decoding, randomizing, and lane alignment.

The XAUI TX/RX sublayer (10 Gigabit attachment unit interface transmit and receive sublayer) provides the electrical functionality for transmission and reception of 3 Gigabit 4-channel serial data. The functionality includes clock multiplication and data serialization, clock data recovery and data de-serialization, signal amplification, and differential signal driving.

Figure 4:
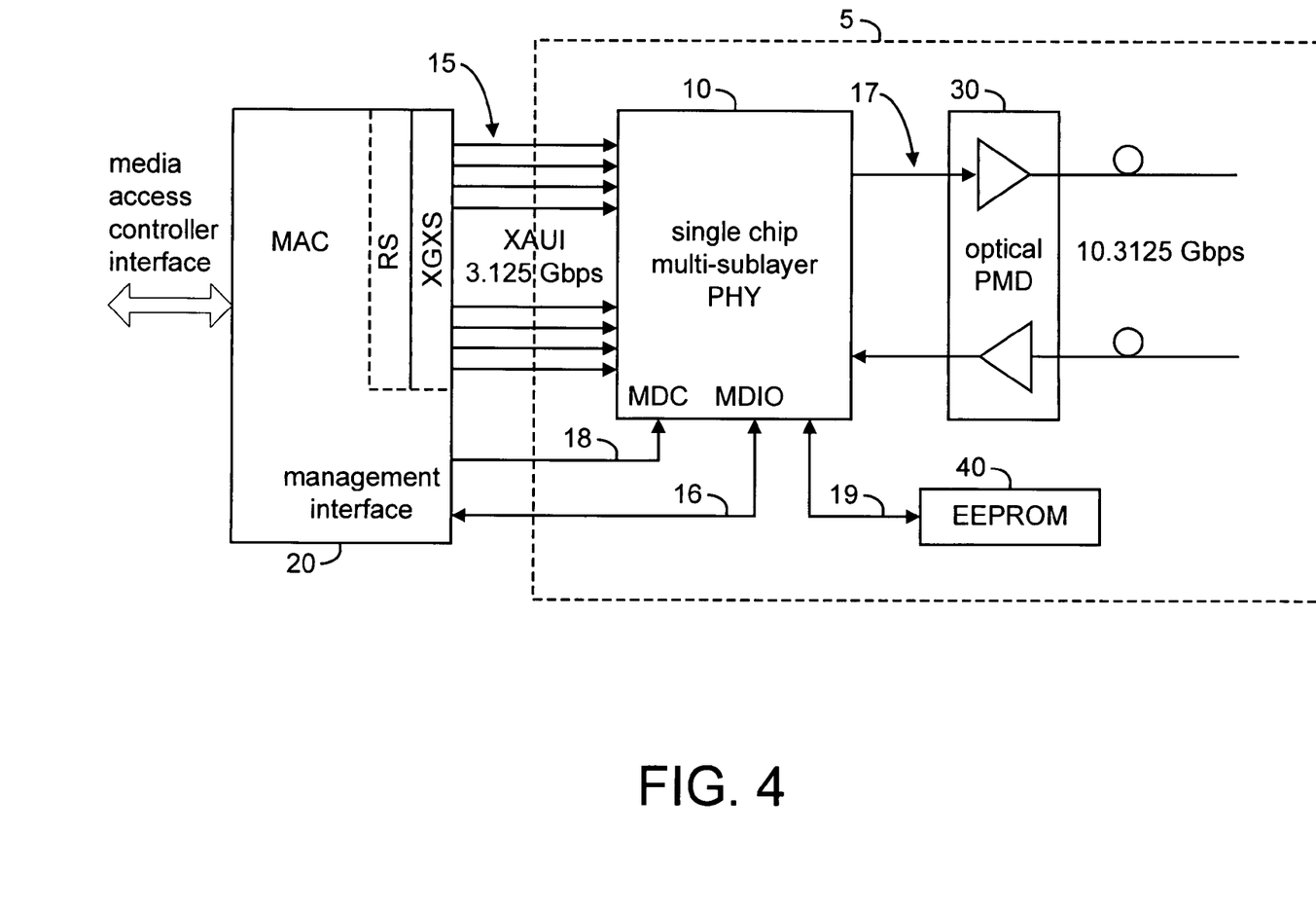
FIG. 4 is a schematic block diagram illustrating certain components of a 10 Gigabit transceiver module with a XAUI interface in accordance with an embodiment of the present invention.

FIG. 4 is a schematic block diagram illustrating certain components of a Gigabit transceiver module 5 with a XAUI interface 15 in accordance with an embodiment of the present invention. The transceiver module 5 may, in one embodiment of the present invention, be compatible with the XENPAK optical module standard. The transceiver module 5 may, in one embodiment of the present invention, be compatible with the XPAK optical module standard. The transceiver module 5 includes, for example, a single-chip multi-sublayer PHY 10, an optical PMD 30, and an EEPROM 40.

According to an embodiment of the present invention, a media access controller (MAC) 20 interfaces to the single-chip multi-sublayer PHY 10 through the XAUI transmit and receive interface 15. In general, the MAC layer is one of two sublayers of the data link control layer and is concerned with sharing the physical connection to a network among several upper-level systems. The single-chip multi-sublayer PHY 10 interfaces to the optical PMD 30 through a PMD transmit and receive interface 17. The MAC 20 also interfaces to the single-chip multi-sublayer PHY 10 through the serial MDIO (management data input/output) interface 16. The single-chip multi-sublayer PHY 10 also interfaces to EEPROM 40 through a two-wire serial interface 19. A separate XGMII (10 Gigabit media independent interface) is not needed.

The XAUI interface 15 includes 4 channels of 3 Gigabit serial data received by the single-chip multi-sublayer PHY 10 from the MAC 20 and 4 channels of 3 Gigabit serial data transmitted from the single-chip multi-sublayer PHY 10 to the MAC 20. In an embodiment of the present invention, the MAC includes a XGXS sublayer interface and a reconciliation sublayer (RS) interface. In one embodiment of the present invention, for Ethernet operation, the 3 Gigabit data rate is actually 3.125 Gbps and for Fibre Channel operation, the 3 Gigabit data rate is actually 3.1875 Gbps.

The PMD interface 17 includes a 10 Gigabit serial transmit differential interface and a 10 Gigabit serial receive differential interface between the single-chip multi-sublayer PHY 10 and the optical PMD 30 in accordance with an embodiment of the present invention. In one embodiment of the present invention, for Ethernet operation, the 10 Gigabit data rate is actually 10.3125 Gbps and for Fibre Channel operation, the 10 Gigabit data rate is actually 10.5188 Gbps.

Figure 5:
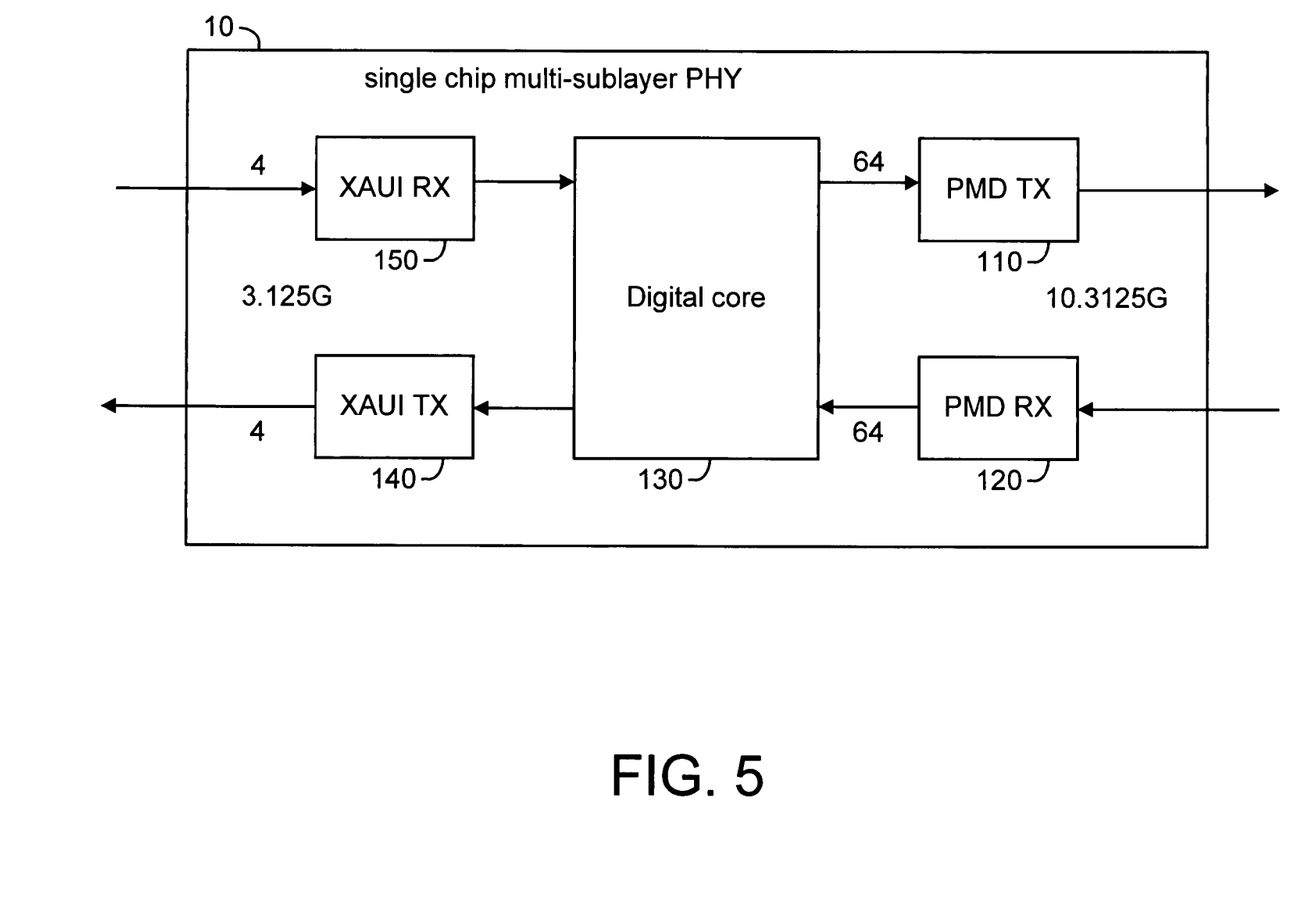
FIG. 5 is a schematic block diagram of a single-chip multi-sublayer PHY used in the transceiver module of FIG. 4 in accordance with an embodiment of the present invention.

FIG. 5 is a schematic block diagram of the single-chip multi-sublayer PHY 10 used in the transceiver module 5 of FIG. 4 in accordance with an embodiment of the present invention. The single-chip multi-sublayer PHY 10 includes a PMD transmit (TX) section 110, a PMD receive (RX) section 120, a digital core section 130, a XAUI transmit (TX) section 140, and a XAUI receive (RX) section 150.

Figure 6:
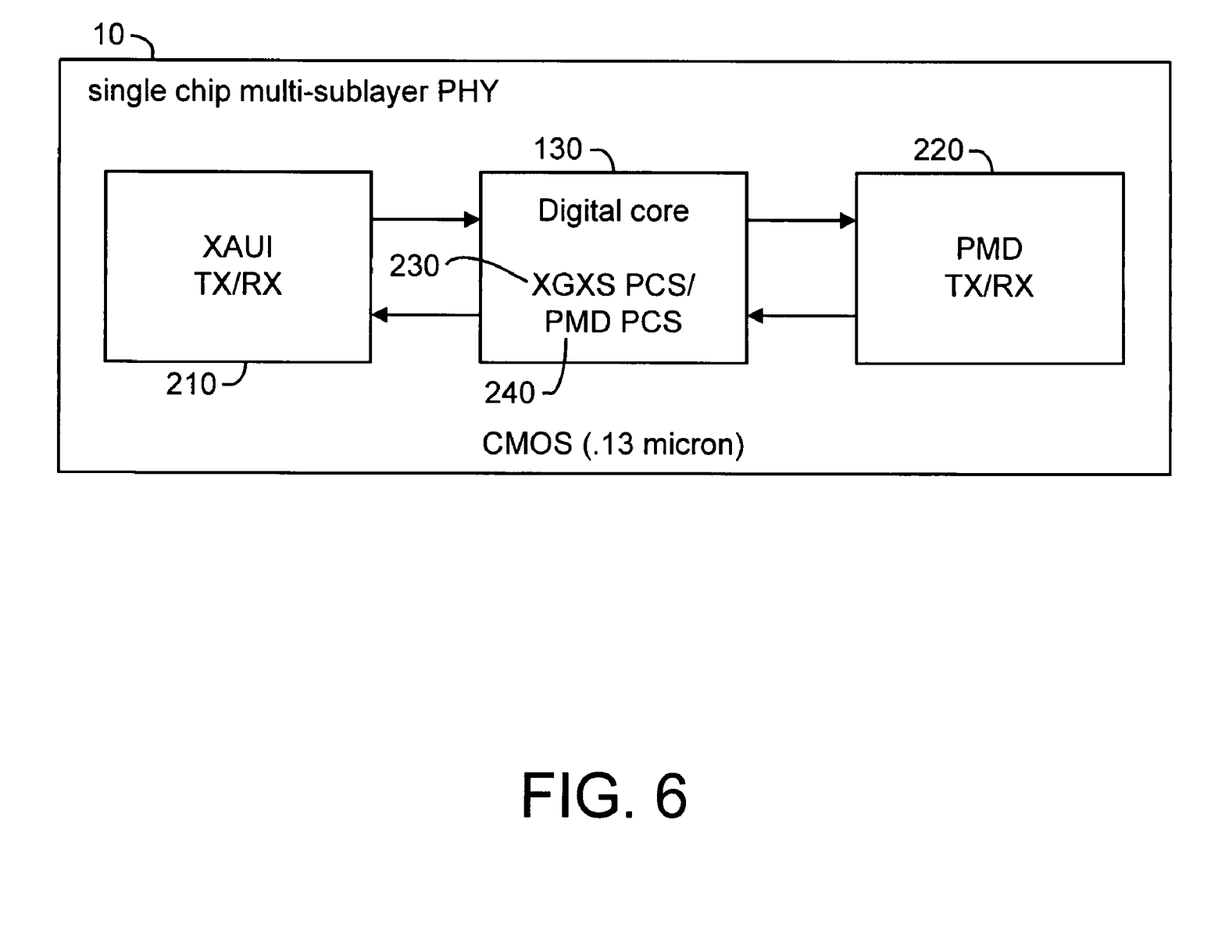
FIG. 6 is a schematic block diagram of the single-chip multi-sublayer PHY of FIG. 5 illustrating the various sublayers in accordance with an embodiment of the present invention.

Referring to FIG. 6, the PMD TX section 110 and PMD RX section 120 form a 10 Gigabit PMD TX/RX sublayer 220 in accordance with an embodiment of the present invention. The XAUI TX section 140 and XAUI RX section 150 form a 3 Gigabit XAUI TX/RX sublayer 210 in accordance with an embodiment of the present invention. The digital core section 130 comprises a XGXS PCS sublayer 230 and PMD PCS sublayer 240 in accordance with an embodiment of the present invention.

Figure 7:
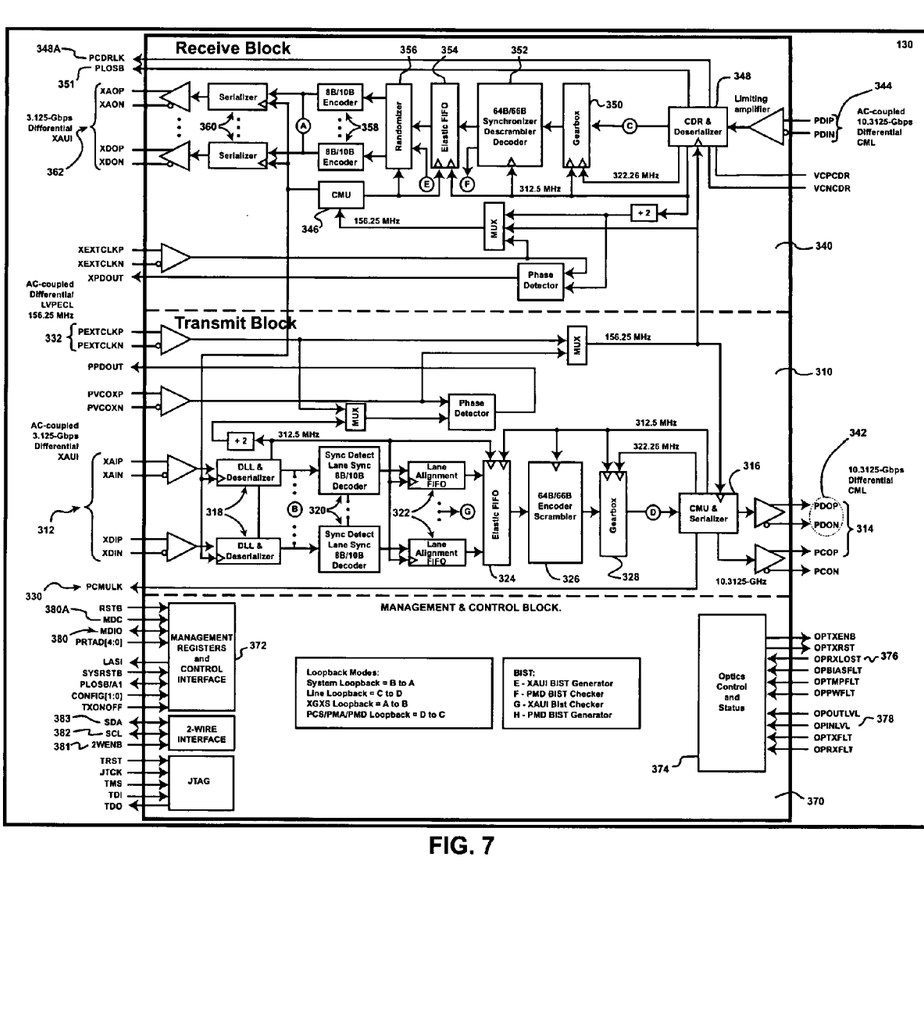
FIG. 7 is a more detailed schematic block diagram of the single-chip multi-sublayer PHY of FIG. 5 used in the transceiver module of FIG. 4 in accordance with an embodiment of the present invention.

FIG. 7 is a more detailed schematic block diagram of the single-chip multi-sublayer PHY 10 of FIG. 5 used in the transceiver module 5 of FIG. 4 in accordance with an embodiment of the present invention. The single-chip multi-sublayer PHY 10 comprises three main blocks including a transmit block 310, a receive block 340, and a management and control block 370 including management registers and control interface 372 and optics control and status 374. Clock interfaces are provided for configuring the XAUI and PMD interfaces to asynchronous or independent asynchronous operations in accordance with an embodiment of the present invention.

The transmit block 310 collects 4-lane 3 Gigabit data at the XAUI receivers 150 and reformats the data for 10 Gigabit serial transmission at the PMD differential CML drivers 110 in accordance with an embodiment of the present invention. The PMD CMU (clock multiplier unit)/Serializer 316 in the PMD TX/RX sublayer 220 is phase-locked to an external reference clock 332. Each XAUI receiver (one per lane) in the XAUI TX/RX sublayer 210 has an internal delayed-lock loop (DLL), in DLL & Deserializer 318, to synchronize the sampling clock to the incoming data. After synchronization, a 3 Gigabit sampling clock samples the data in the center of the data eye pattern. The phase relationship between the edge transitions of the data and those of the sampling clock are compared by a phase/frequency discriminator. Output pulses from the discriminator indicate the direction of phase corrections. The pulses are smoothed by a loop filter. The output of the loop filter controls the internal phase interpolators which generate the sampling clock. The XAUI CMU phase locked loop (PLL) within the XAUI TX/RX sublayer 210 generates the clocks for the internal DLL phase interpolations.

For each XAUI DLL of the DLL & Deserializer 318 within the XAUI TX/RX sublayer 210, the single-chip multi-sublayer PHY 10 contains a loss-of-signal (LOS) detect circuit which monitors for data present at the XAUI receiver inputs 312. A minimum single-ended input signal swing is used for a valid lock condition. The status of each individual LOS detector is observable in an internal register of the single-chip 10.

The XAUI serial inputs 312 to the XAUI TX/RX sublayer 210 are to be AC-coupled in accordance with an embodiment of the present invention. AC coupling prevents voltage drops across input devices of the single-chip 10 when the input signals are sourced from a higher operating voltage device. If DC coupling is used, care is exercised to guarantee that the input signals do not exceed VDD levels. Noise due to overshoot and undershoot transients are also to be accounted for.

Each XAUI serial data stream is de-serialized to a 10-bit word by a serial-to-parallel converter of the DLL & Deserializer 318 within the XAUI TX/RX sublayer 210. The DLL output clocks the serial-to-parallel converter. Under normal operation, the DLL recovers the clock from the data. If data is not present, the clock is recovered from the internal reference clock. The output is sent to the XGXS PCS sublayer 230 in the digital core 130.

A sync acquisition sub-block (part of Sync Detect; Lane Sync; 8B/10B Decoder 320) in the XGXS PCS sublayer 230 within the digital core 130 performs code group synchronization on the incoming 10-bit bytes from the DLL & Deserializer 318. A two-stage 10-bit shift register is used to recognize the valid boundary of the /COMMA/ (K28.5) code group. Once a single /COMMA/ is detected, the 8B/10B decoder (in Sync Detect; Lane Sync; 8B/10B Decoder 320) is enabled. Upon detection of four /COMMA/ code groups without any intervening invalid code group errors, Sync Acquisition is declared.

The 8B/10B decoder (in Sync Detect; Lane Sync; 8B/10B Decoder 320) performs illegal code checks, running disparity checks, invalid code checks, and miscellaneous decoding logic within the XGXS PCS sublayer 230. Both an illegal code and a running disparity error may cause an invalid code which advances the invalid code counter for performance monitoring. The invalid code counter is cleared upon a read access.

Running disparity (RD) is the difference between the number of 1's and 0's in a block of data. RD is positive when there are more ones and negative when there are more zeros. Each encoded 10 bits must have a RD of 0, +2, or −2 to ensure a high bit transition density for reliable clock recovery. Additionally, the RD encoding is alternated for DC balancing (maintaining an equal number of 1's and 0's). When an invalid code is received, the decoder replaces it with an /E/ (error code) K30.7 and increments the invalid counter. If a legitimate /E/ is received, the decoder passes it to the PCS without incrementing the invalid counter.

At the beginning of lane alignment each of the four Lane Alignment FIFO write-pointers (of the Lane Alignment FIFOs 322 within the XGXS PCS sublayer 230) is enabled upon detection of an /A/ on its lane in accordance with an embodiment of the present invention. The FIFO's 322 common read-pointer is enabled when all four XAUI lanes have detected /A/. Once an /A/ is detected in one lane without /A/ detections in the other three lanes within a programmable window (skew budget), all FIFOs 322 are reset forcing the lane alignment to start over again. The Lane Alignment FIFOs 322 support lane skew compensation of up to 5 byte-clocks. The device allows the user to have the external 21 UI as specified in IEEE 802.3ae.

The PMD PCS sublayer 240 uses a transmission code to improve the transmission characteristics of information to be transferred across the link and to support transmission of control and data characters in accordance with an embodiment of the present invention. The 64B/66B encoding (defined by IEEE 802.2ae clause 49 for transmission code and performed by the 64B/66B Encoder/Scrambler 326) ensures that sufficient transitions are present in the PHY bit stream to make clock recovery possible at the receiver.

The TX gearbox 328 in the PMD PCS sublayer 240 is a buffer that converts 66-bit data to 64-bit data for more efficient serialization. The TX gearbox 328 receives 66-bit data from the 64B/66B Encoder/Scrambler 326 and a 2-bit sync from the Type Generator at 156.25 MHz. The TX gearbox 328 outputs 64-bit data at 322.265 MHz to the PMD CMU/Serializer 316 within the PMD TX/RX sublayer 220. A register bank is employed which is accessed in a circular manner.

Data is read out of the TX gearbox 328 using an internally generated 322.265 MHz clock. The data is converted to a 10 Gigabit serial stream within PMD TX/RX sublayer 220 and driven off-chip. Bit 0 of frame 0 (LSB) is shifted out first.

The PMD CMU/Serializer 316 within the PMD TX/RX sublayer 220 has a PLL that generates the 10 Gigabit clock by multiplying the internal 156.25 MHz reference clock.

The single chip 10 includes a lock detect circuit, which monitors the frequency of the internal VCO. The lock detect status is observable in the Analog Transceiver Status Register 0. Register bit P_LKDTCMU goes high when the PMD CMU PLL is locked. The CMU lock detect signal is also provided as an output status at the PCMULK pin 330.

The CML serial outputs (PCOP/N and PDOP/N) 314 may be AC-coupled or DC-coupled. The CML outputs are powered at +1.8V. Certain pins provide power to PCOP/N and PDOP/N, respectively. These high-speed CML outputs comprise a differential pair designed to drive a 50Ω transmission line. The output driver is back terminated to 50Ω on-chip, providing snubbing of any reflections.

An optical enable output, controlled by the TXON discrete input or the Management Interface allows for the option to deactivate the optical transmitter in the optical PMD 30. The polarity of PDIP/N 344 and PDOP/N 342 may be reversed to accommodate difficult printed circuit board (PCB) layouts. Each differential signal pair has its own polarity control bit in the PMD/Optics Digital Control Register.

The single-chip 10 complies with the jitter specifications proposed for 10-Gbps Ethernet equipment defined by IEEE 802.3ae. The reference clock characteristics adhere to the requirements in accordance with an embodiment of the present invention.

The receiver block 340 accepts 10 Gigabit serial PMD data and reformats the data for transmission on the 4-lane 3 Gigabit XAUI transmitters 362. One of the 3 Gigabit CMU clocks in the XAUI TX/RX sublayer 210 is used to retime all four XAUI transmitters. The XAUI CMU 346 in the XAUI TX/RX sublayer 210 is phase-locked to an external reference clock.

The PMD clock and data recovery (CDR)/Deserializer 348 within the PMD TX/RX sublayer 220 generates a clock that is at the same frequency as the incoming data bit rate (10 Gigabit data rate) at the serial data inputs, PDIP/N 344. The clock is phase-aligned by a PLL so that it samples the data in the center of the data eye pattern in accordance with an embodiment of the present invention.

The phase relationship between the edge transitions of the data and those of the generated clock are compared by a phase/frequency discriminator. Output pulses from the discriminator indicate the direction of phase corrections.

The output of the loop filter controls the frequency of the VCO, which generates the recovered clock. Frequency stability without incoming data is guaranteed by an internal reference clock that the PLL locks onto when data is lost.

The single-chip 10 includes a lock detect circuit that monitors the 10 Gigabit frequency of the internal VCO within the PMD TX/RX sublayer 220. The frequency of the incoming data stream is within ±100 ppm of the 10 Gigabit data stream for the lock detector to declare signal lock. The lock detect status is observable in the Analog Transceiver Status Register 0. P_LKDTCDR goes high when the PMD CDR/Deserializer 348 is locked to the incoming data. The CDR lock detect signal is also provided as an output status at the PCDRLK pin 348A.

The single-chip 10 includes a loss-of-signal (LOS) detect circuit that monitors the integrity of the serial receiver data path in the PMD TX/RX sublayer 220. A peak detector looks for a minimum amplitude swing. If the serial data input is not present, the LOS_P bit in the Analog Transceiver Status Register 0 is set to zero.

The CDR/Deserializer 348 attempts to lock to the reference clock when the signal is less than the minimum amplitude swing and the P-LOSB_SEL bit is set accordingly. The loss of signal (LOS) from a peak detector condition is also reflected at the PLOSB output signal pin 351.

The OPRXLOS 376 input pin is used by the external optical receiver's LOS monitoring to indicate the loss-of-light condition. The OPRXLOS directly or combined with the peak detector logic described above could force the CDR/Deserializer 348 to lock to the reference clock. The OPRXLOS polarity is programmable with the OPINLVL control bit in the PHY Identifier Register or pin OPINLVL 378 in accordance with an embodiment of the present invention.

The PMD CML serial inputs (PDIP/N) 344 on the single-chip 10 may be AC-coupled. AC coupling prevents voltage drops across input devices of the single-chip 10 when the input signals are sourced from a higher operating voltage device. If DC coupling is used, care should be exercised to guarantee that the input signals do not exceed VDD levels. Noise due to overshoot and undershoot transients should be accounted for.

The PMD serial data stream is deserialized by a serial-to-parallel converter of CDR/Deserializer 348 in the PMD TX/RX sublayer 220. The CDR output clocks the serial-to-parallel converter. Under normal operation, the CDR recovers the clock from the data. If data is not present, the clock is recovered from the internal reference clock. The output is sent to the RX Gearbox 350 within PMD PCS sublayer 240. The RX Gearbox 350 performs an equivalent function (in reverse) as the TX Gearbox 328.

A Frame Synchronizer (which is a part of the 64B/66B Synchronizer/Descrambler/Decoder 352 in the PMD PCS sublayer 240) searches for the 66-bit boundary of the frame data and obtains lock to 66-bit blocks using the sync header and outputs 66-bit blocks. The descrambler (which is also a part of the 64B/66B Synchronizer/Descrambler/Decoder 352 in the PMD PCS sublayer 240) processes the payload to reverse the effect of the scrambler using the same polynomial. The receiver process decodes blocks according to IEEE 802.3ae clause 49.

The Randomizer 356 in XGXS PCS sublayer 230 reduces EMI during the interpacket gap (IPG). The resultant idle patterns at the XAUI transmitters would be a repetitive high-frequency signal due to the 8B/10B encoder 358. The Randomizer 356 outputs random /A/K/R/ patterns in all for lanes during the IPG. The Randomizer 356 starts on the column containing the End-of-Packet byte, EOP (T), and ends on SOP (start-of-packet). The polynomial, $1+x^3+x^7$ is used by the Randomizer 356. For example, refer to IEEE 802.3ae Draft 5.0.

The 8B/10B Encoder 358 within the XGXS PCS sublayer 230 converts a byte-wide data stream of random 1's and 0's into a 10-bit DC-balanced serial stream of 1's and 0's with a maximum run length of 6. The code provides sufficient bit transitions to ensure reliable clock recovery.

Data is read out of the 8B/10B Encoder 358 using an internally generated 312.0-MHz clock. The data is then converted to a 3 Gigabit serial stream by Serializer 360 within XAUI TX/RX sublayer 210 and driven off-chip. Bit 0 of frame 0 (LSB) is shifted out first and is mapped to "A" of the 8B/10B encoder in accordance with an embodiment of the present invention.

The XAUI CMU 346 within the XAUI TX/RX sublayer 210 has a PLL that generates the 3 Gigabit clock by multiplying the internal 156.25-MHz reference clock in accordance with an embodiment of the present invention. The single-chip 10 includes a lock detect circuit, which monitors the frequency of the internal VCO. The CMU lock detect bit goes high when the XAUI CMU PLL is locked. The lock detect status is in the Analog Transceiver Status Register 0, bit 7.

The XAUI serial outputs, X[A:D]OP/N 362, may be AC-coupled. The CML outputs are powered at +1.2V. The high-speed XAUI outputs comprise a differential pair designated to drive a 50'Ω transmission line. The output driver is back terminated to 50'Ω on-chip, providing snubbing of any reflections. The output driver also has pre-emphasis capability to compensate for frequency selective attenuation of FR-4 traces to compensate for ISI (inter symbol interference). The option is controlled via the XAUI Pre-emphasis Controller Register in accordance with an embodiment of the present invention.

The single-chip XAUI transmit and receive block interfaces provide the option to reverse the lane order and/or the lane polarity. The option is controlled via the XAUI Digital Control Register. The XAUI I/O interface lane assignment package pins may be reversed to accommodate difficult PCB layouts. A lane flipper optionally performs a byte-wise flip of the internal 32-bit data. By default, lane A carries byte 0, lane B carries byte 1, lane C carries byte 2, and lane D carries byte 3. When the Lane Flipper is enabled, lane A carries byte 3, lane B carries byte 2, lane C carries byte 1, and lane D carries byte 0. Setting bits XAUI_TX_FLIP_B and XAUI_RX_FLIP_B in the Management Interface XAUI Digital Control Register to zero reverses the XAUI lane order in accordance with an embodiment of the present invention.

The XAUI I/O interface bit assignment (P to N) to package pins may be reversed to accommodate difficult PCB layouts. Assert bits XAUI_TZ_INV and XAUI_RX_INV in the Management Interface XAUI Digital Control Register to reverse the XAUI lane polarity.

The single-chip multi-sublayer PHY 10 supports asynchronous clocking mode operation of the XAUI and PMD interfaces. The local reference clock or external transmit VCXO may adhere to the IEEE specifications.

In the asynchronous mode, an elastic FIFO 354 is used that accommodates a frequency difference of up to 200 ppm between a recovered clock and a local reference clock. Both the RX and TX data paths 310 and 320 contain elastic FIFOs 354 and 324. Idle columns of four bytes are inserted or deleted during the IPG (inter packet gap) once the distance between the elastic FIFO's read and write pointers exceed a threshold. In addition, a column of sequence orders may be deleted during the IPG once the distance between the elastic FIFO's read and write pointer exceed a threshold. The delete adjustments only occur on IPG streams that contain at least two columns of idles or sequence order sets.

Figure 8:
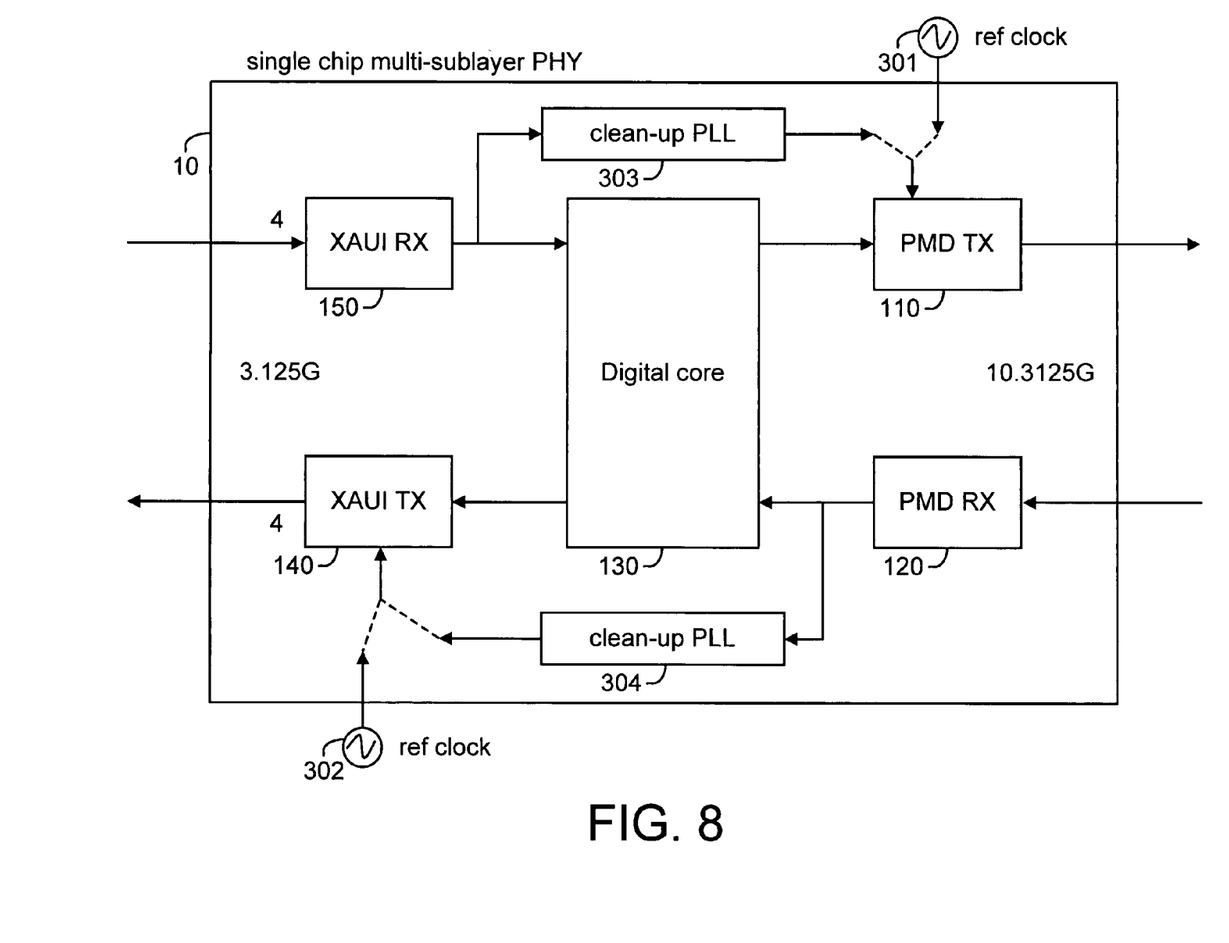
FIG. 8 is a schematic block diagram of the single-chip multi-sublayer PHY of FIG. 5 illustrating a synchronous mode and an asynchronous mode in accordance with an embodiment of the present invention.

Referring to FIG. 8, the single-chip 10 supports an asynchronous mode that uses an external reference clock 301 (or two external reference clocks 301 and 302) for the PMD transmitter 110 and XAUI transmitter 140 in accordance with an embodiment of the present invention. Therefore, the Elastic FIFOs 324 and 354 are enabled to accommodate frequency differences between the XAUI DLL clock and the PMD CMU clock (external reference clock) and the PMD CDR clock and the XAUI CMU clock (external reference clock). The asynchronous mode also supports an independent transmit path reference clock and a receive path reference clock.

Clock cleanup mode uses the external VCXO to clean up a noisy system clock provided for the asynchronous mode of operation. The transmit block phase detector locks to the external reference clock rather than the XAUI DLL clock. The cleanup PLL lock detect status is available in Analog Transceiver Status Register, bit 1.

In the synchronous mode, a 156 MHz reference clock is derived within the single-chip 10 from the incoming 10 Gigabit data on the PMD side. Also, a 156 MHz reference clock is derived from the incoming 3 Gigabit data on the XAUI side. Clean-up PLL's 303 and 304 may be used (see FIG. 8) to clean up any noise on the internally generated reference clocks. FIG. 8 illustrates that the single-chip 10 may be switched between the asynchronous mode and the synchronous mode in accordance with an embodiment of the present invention.

In one embodiment of the present invention, all modes of the single-chip multi-sublayer PHY 10 are programmable, including synchronous mode, asynchronous mode, Ethernet mode, and Fibre Channel mode. The EEPROM 40 may be pre-programmed to power up the transceiver module 5 into certain modes.

In an embodiment of the present invention, the same single-chip 10 may be used for 10 Gigabit Ethernet applications and for 10 Gigabit Fibre Channel applications. In other words, a user may purchase a single chip and select a 10 Gigabit Ethernet configuration, a 10 Gigabit Fibre Channel configuration, or both.

The single-chip 10 supports the IEEE 802.3 Clause 45 Station Management Interface. A 1-bit shift register receives data from the MDIO pin 16 of FIG. 4 (380 in FIG. 7) on the rising edge of the MDC clock pin 18 of FIG. 4 (380A in FIG. 7). The frame format begins with a preamble for clock synchronization followed by the start-of-frame sequence. The read or write op-code, PRTAD and DVEAD fields follow next. Three device types are supported by DVEAD: 00001=PMA/PMD, 00011=PCS, or 00100=XGXS PHY. Depending on the read/write op-code, data is either received or transmitted by the single-chip 10. Once the 16-bit data field is transferred, the MDIO signal 16 is returned to a high-impedance state (idle).

During idle, MDC 18 is not required to be active. A read operation configures the MDIO 16 as an output. A write operation configures the MDIO 16 as an input. Writes to an unsupported register address are ignored. The PRTAD field is configurable via the PRTAD pins. The MDIO interface 16 supports 1.2V operation in accordance with an embodiment of the present invention.

The single-chip 10 provides a 2-wire serial interface 19 (381-383 in FIG. 7) that enables the system to access external nonvolatile memory devices through the MDIO interface 16. The single-chip 10 2-wire serial interface 19 accesses the external devices through two dedicated interface signals, SDA (data) 383 and SCL (clock) 382.

The nonvolatile memory 40 stores device configuration and optical-module data, such as module identification, transceiver capabilities, standard level of support, manufacture, and vendor information. The content is programmed into the EEPROM 40 by the module vendor at manufacture. The default data rate setting for 2-wire is 100 kHz. The 2-wire interface 19 supports up to 32 kilobytes of memory-accessing with burst read or write mode operations. The 2-wire interface 19 supports reads from the starting location of the last location written to incremented by 1.

A random read sets the address point to the desired location. The EEPROM address pointer may be set for the location to be read. The single-chip 10 does not support multi-Master Arbitration. The 2WENB signal 381 permits tristating the SDA 383 and SCL 382 outputs to allow other master devices access to the EEPROM 40. A clock synchronizing mechanism is provided at the 2-wire interface 19 as a handshake means for the byte-level data transfers between the single-chip 10 and the EEPROM slave device 40.

The slave is able to hold the SCL line low after reception and acknowledgment of a byte and forces the master (single-chip 10) into a wait state until the slave is ready for the next byte transfer. To accommodate the feature, the high period of the clock immediately following the acknowledge byte appears extended, even if the slave is immediately ready for the transfer of the next byte.

The single-chip 10 loads the first 256 bytes of EEPROM location (000-255) into a shadow memory on-chip at MDIO address locations at initialization through the 2-wire interface 19 in accordance with an embodiment of the present invention. After reset, the system should wait 50 ms before accessing the shadow memory for proper content read. Shadow memory is write-protected from certain address locations. The single-chip 10 is capable of loading its control register setting from the EEPROM after exiting from the reset state.

In accordance with an embodiment of the present invention, all sublayers of the single-chip multi-sublayer PHY 10 are implemented in 0.13 micron CMOS technology.

The various elements of the system and method may be combined or separated according to various embodiments of the present invention.

In summary, certain embodiments of the present invention afford an approach for integrating multiple sublayers of a PHY onto a single-chip in such that the single-chip supports both 10 Gigabit Ethernet and 10 Gigabit Fibre Channel operation in the same transceiver module.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A single-chip multi-sublayer PHY to support 10 Gigabit digital serial communications, said single-chip comprising:
   a Physical Media Dependent (PMD) transmit/receive Complementary Metal Oxide Semiconductor (CMOS) sublayer supporting at least 10 Gigabit Ethernet operation, 10 Gigabit Fibre Channel operation, and signal equalization, wherein said PMD transmit/receive CMOS sublayer comprises a PMD transmitter and a PMD receiver;
   a Physical Media Dependent Physical Coding Sublayer (PMD PCS) CMOS sublayer supporting at least 10 Gigabit Ethernet operation and 10 Gigabit Fibre Channel operation;
   a 10 Gigabit Ethernet Physical Coding Sublayer (XGXS PCS) CMOS sublayer supporting at least 10 Gigabit Ethernet operation and 10 Gigabit Fibre Channel operation; and
   a 10 Gigabit Attachment Unit Interface (XAUI) transmit/receive CMOS sublayer supporting at least 10 Gigabit Ethernet operation and 10 Gigabit Fibre Channel operation, wherein said XAUI transmit/receive CMOS sublayer comprises a XAUI transmitter and a XAUI receiver,
   wherein said PMD transmitter and said XAUI transmitter are operable to switch between at least one internally generated reference clock and at least one externally generated reference clock to support the 10 Gigabit digital serial communications based upon an asynchronous mode or synchronous mode, wherein said single-chip operates in said synchronous mode using said at least one internally generated reference clock and said single-chip operates in said asynchronous mode using said at least one externally generated reference clock.

2. The single-chip of claim 1, wherein said PMD transmit/receive CMOS sublayer, said PMD PCS CMOS sublayer, said XGXS PCS CMOS sublayer, and said XAUI transmit/receive CMOS sublayer comprise 0.13 micron CMOS technology.

3. The single-chip of claim 1, wherein said XAUI transmit/receive CMOS sublayer comprises an interface to a media access controller (MAC).

4. The single-chip of claim 1, wherein said PMD transmit/receive CMOS sublayer comprises an interface to an optical PMD.

5. The single-chip of claim 1, wherein said single chip comprises an interface to a non-volatile memory.

6. The single-chip of claim 1, wherein said single chip comprises a single MDIO interface.

7. The single-chip of claim 1, wherein said single-chip is compatible with a XENPAK Multi-Source Agreement.

8. The single-chip of claim 1, wherein said single-chip is compatible with a XPAK Multi-Source Agreement.

9. A method to support 8 Gigabit digital serial communications, said method comprising:
   integrating a Physical Media Dependent (PMD) transmit/receive Complementary Metal Oxide Semiconductor (CMOS) sublayer into a single-chip multi-sublayer PHY to support at least 10 Gigabit Ethernet operation, 10 Gigabit Fibre Channel operation, and signal equalization, wherein said PMD transmit/receive CMOS sublayer comprises a PMD transmitter and a PMD receiver;
   integrating a Physical Media Dependent Physical Coding Sublayer (PMD PCS) CMOS sublayer into said single-chip multi-sublayer PHY to support at least 10 Gigabit Ethernet operation and 10 Gigabit Fibre Channel operation;
   integrating a 10 Gigabit Ethernet Physical Coding Sublayer (XGXS PCS) CMOS sublayer into said single-chip multi-sublayer PHY to support at least 10 Gigabit Ethernet operation and 10 Gigabit Fibre Channel operation; and
   integrating a 10 Gigabit Attachment Unit Interface (XAUI) transmit/receive CMOS sublayer into said single-chip multi-sublayer PHY to support at least 10 Gigabit Ethernet operation and 10 Gigabit Fibre Channel operation, wherein said XAUI transmit/receive CMOS sublayer comprises a XAUI transmitter and a XAUI receiver,
   wherein said PMD transmitter and said XAUI transmitter are operable to switch between at least one internally generated reference clock and at least one externally generated reference clock to support said 10 Gigabit digital serial communications based upon an asynchronous mode or synchronous mode, wherein said single-chip multi-sublayer PHY operates in said synchronous mode using said at least one internally generated reference clock and said single-chip multi-sublayer PHY operates in said asynchronous mode using said at least one externally generated reference clock.

10. The method of claim 9, wherein said PMD transmit/receive CMOS sublayer, said PMD PCS CMOS sublayer, said XGXS PCS CMOS sublayer, and said XAUI transmit/receive CMOS sublayer comprise 0.13 micron CMOS technology.

11. The method of claim 9, comprising interfacing said XAUI transmit/receive CMOS sublayer to a media access controller (MAC).

12. The method of claim 9, comprising interfacing said PMD transmit/receive CMOS sublayer to an optical PMD.

13. The method of claim 9, comprising interfacing said single-chip to a non-volatile memory.

14. The method of claim 9, comprising integrating a single MDIO interface into said single-chip.

15. The method of claim 9, wherein said single-chip is compatible with a XENPAK Multi-Source Agreement.

16. The method of claim 9, wherein said single-chip is compatible with a XPAK Multi-Source Agreement.

\* \* \* \* \*